United States Patent Office 2,837,365
Patented June 3, 1958

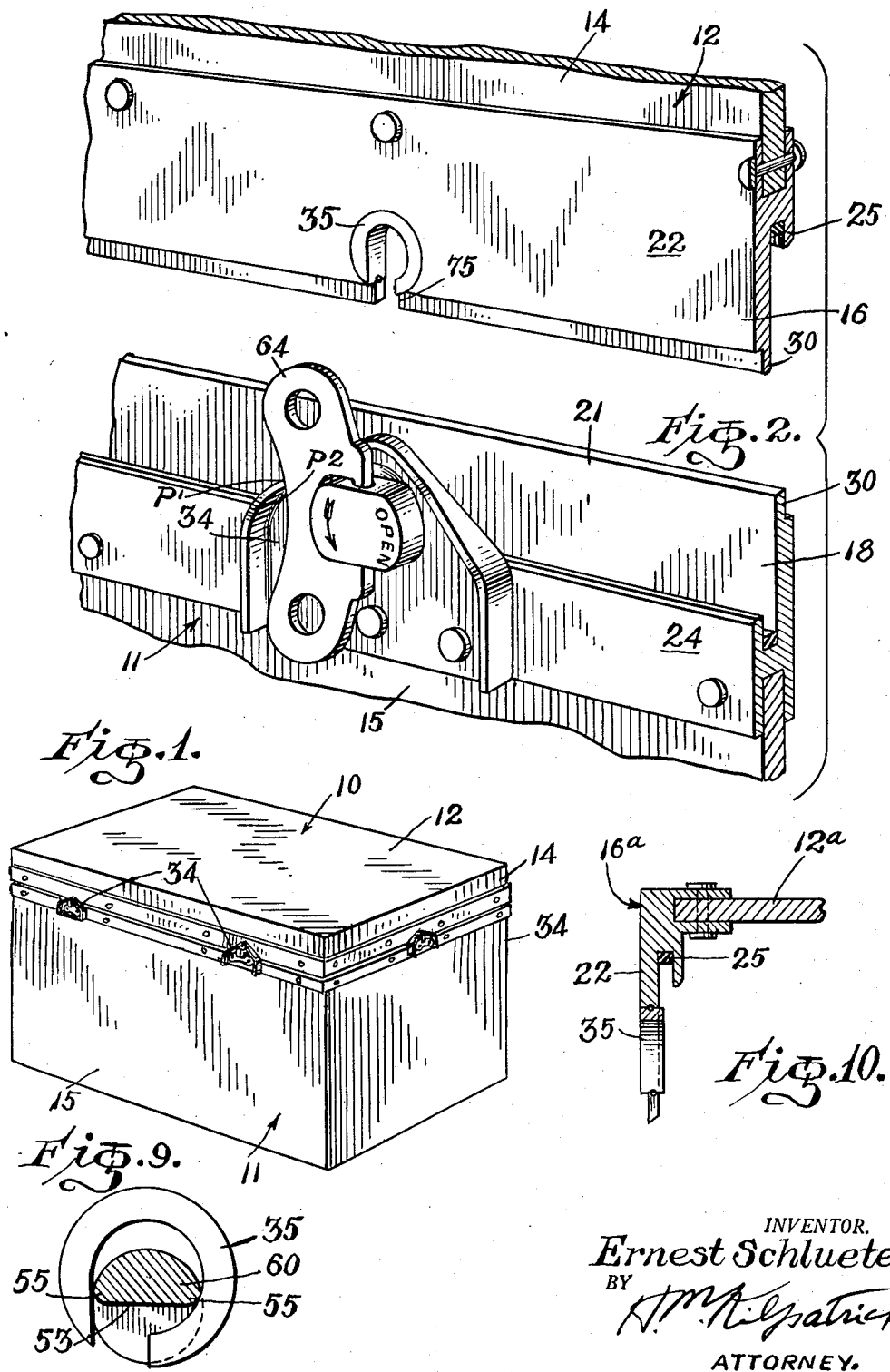
June 3, 1958 — E. SCHLUETER — 2,837,365
DOUBLE SEAL JOINT AND LOCK THEREFOR
Filed June 23, 1955 — 2 Sheets-Sheet 1
INVENTOR.
Ernest Schlueter
BY
ATTORNEY.

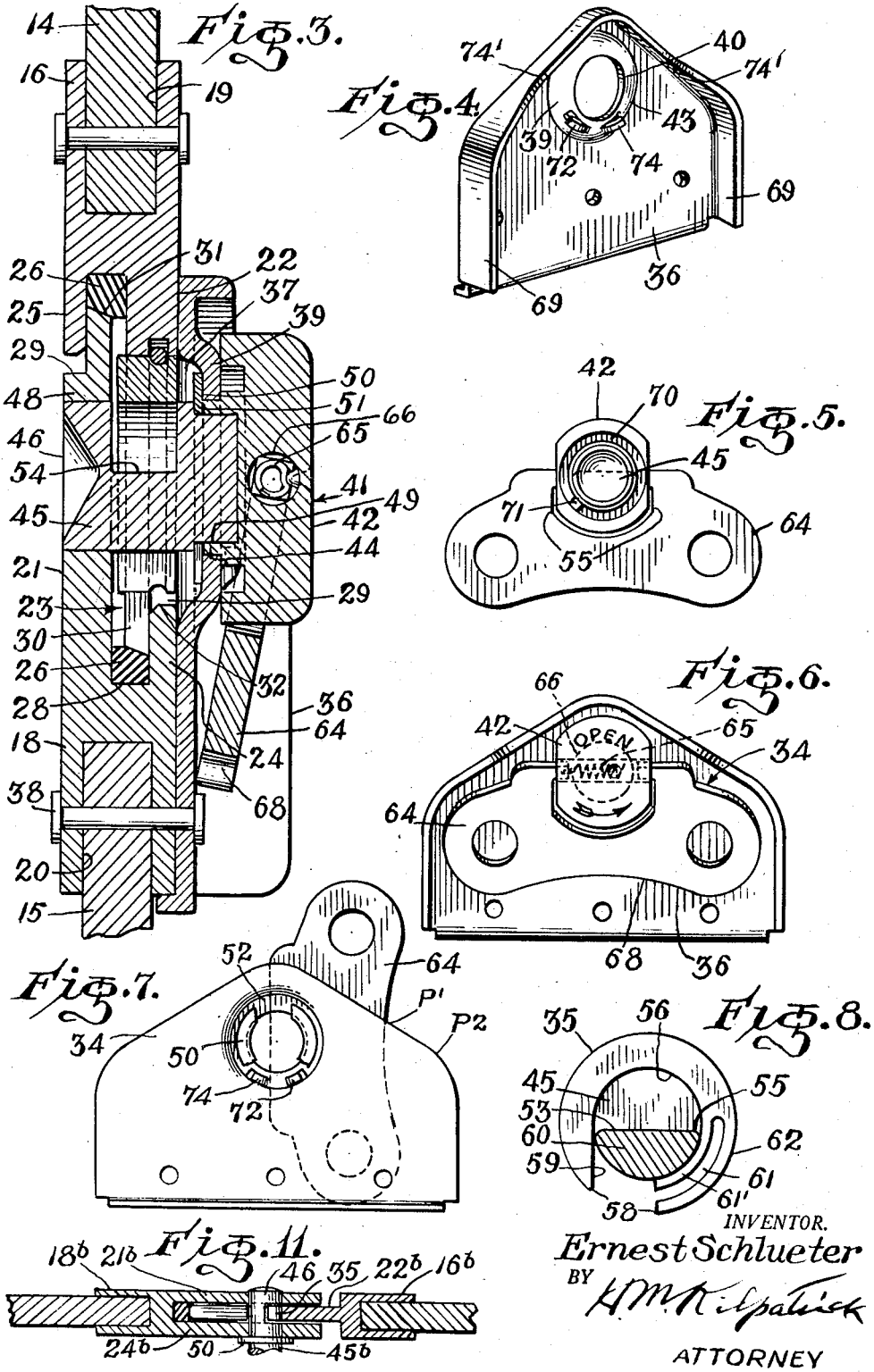

---

2,837,365

DOUBLE SEAL JOINT AND LOCK THEREFOR

Ernest Schlueter, Troy, N. Y.

Application June 23, 1955, Serial No. 517,547

15 Claims. (Cl. 292—240)

This invention relates to joints or joint members and fastening devices and more particularly to a double seal joint for rim or edge portions of containers or cases and an easily manipulated fastening device for securely locking the joint members together.

It is frequently desirable to provide packing boxes or shipping cases, chests and the like which must be capable of extended reuse and withstanding considerable abuse. In general, such cases and the like may possess a certain degree of yieldability; that is to say, the case may allow of a certain amount of repeated deformation by a small fraction of an inch without materially shortening the life of the case. The reuse of such cases has heretofore presented difficult problems, particularly in respect to opening and reclosing without damage to the case.

An object of the present invention is to provide such a case that may be opened and closed without the need of tools.

Another object is to provide a joint for such a case that will secure the top or cover and bottom portions of the case substantially liquid-tight.

Another object is to provide a lock for such joint that will not be affected by vibration or not loosen if the sides of the case are mashed in and which will project outwardly a minimum distance from the case.

Another object is to provide a locked joint that will be strong in shear and tension.

The attainment of these and other objects which will be apparent from the description is accomplished by a joining device which, briefly stated includes tongue end groove or lapped mating casing strips or joining members secured to the casing top and body portions, one of the members being provided with a keeper part having an open ended slot which is somewhat circular at the other end. The other member is provided with a lock having a rotatable bolt including a keeper engaging portion which may pass into the slot when the keeper engaging portion is in one position and then be rotated in the circular part of the slot to a position preventing withdrawal of the bolt from the keeper part. Knob and handle means are provided for rotating the bolt.

In the accompanying drawing showing, by way of example, several of many possible embodiments of the invention, Fig. 1 is a perspective of a casing equipped with the joining device;

Fig. 2 is a perspective of the joining members and the lock;

Fig. 3 is a transverse section of the joining members in locked position, the section being taken substantially through the axis of the bolt;

Fig. 4 is a perspective of a part of the lock;

Fig. 5 is a rear view of the bolt, knob and handle;

Fig. 6 is a front view of the lock;

Fig. 7 is a rear view of the lock in unlocked position;

Fig. 8 is a transverse sectional view of the bolt in locked position;

Fig. 9 is a transverse sectional view of the bolt in semi-locked position; and

Figs. 10 and 11 show modifications of the joining members.

The invention is shown in connection with a packing case 10 having a lower or lock carrying portion 11 and a top or keeper carrying portion 12 mating with each other.

The side panel portions 14 and 15 of the top and lower portions respectively are provided at their lower and upper edges respectively with mating interengaging upper and lower joining or rim members 16 and 18 shown in Figs. 2 and 3 as substantially identical with each other, but symmetrically disposed. These rim members may be of extruded material such as aluminum, although brass, plastic, and similar materials may be used.

Each rim member is somewhat of H shape in cross section providing a deep channel 19 in the upper rim member 16 in which panel portion 12 is mounted, and 20 in the lower rim member 18 in which panel portion 15 is mounted. Extending in the opposite direction from the opening of the channels 15 and 16 are lap portions 21 and 22 on the lower and upper members 18 and 19 and retainer flanges 24 and 25 which terminate quite short of the edge of the lap portions. A strip or cushion 26 of neoprene, rubber or similar resilient material is disposed in a deep medial groove, such as 28, between each lap portion and retaining flange on the same member. As explained below the cushion may be omitted.

Each lap portion is provided with a rabbet groove 29 at the outer edge extremity forming a projection of reduced thickness or tongue 30. In general, the tongue and retainer flange 24 are about one half the thickness of that of the major portion of the lap portion. This enables the joining members to engage with each other with their tongues entering the grooves 28 of the other to engage on the cushions therein. The tongue edges are preferably beveled slightly inwardly as at 31 so that their engagement against the cushions tend to force them against the inner wall of the retaining flanges 24 and 25 so as to make the planar outer faces of the two joining or rim members flush with each other for it is usually necessary that the two lap portions not fit too closely to one another, as shown by the space 23, and that they be less than half the thickness of the joining members 16 and 18, the outermost faces of which lie in parallel planes. For many uses a joining or rim member ⅜ inch thick in its widest part with an ⅛ inch groove 28 and a ¹⁄₁₆ tongue, leaving ¹⁄₁₆ inch clearance between the lap portions is satisfactory. The retainer flanges 24 and 25 are preferably beveled toward the groove 28 as at 32.

For securing the two joining members together, I mount a lock generally designated 34 on the exterior face of one of the rim members (18 as shown in the drawing) bearing the retainer flange (24 in the drawing) for engaging with keeper bushing 35 fast in the lap portion 22 of the mating rim member 16.

The lock comprises a body plate 36 mounted on the rim portion and its panel as by rivets 38 (which also secure the rim portion to the panel) and extending beyond the retainer flange where it is provided with a round boss or hub portion 39 outwardly displaced or stamped thereby forming a recess 37, provided with a round hole or bearing 40.

A turnable bolt assembly generally designated 41 is disposed in the hole and comprises a knob part 42 adjacent the outer face 43 of the hub portion and a cylindrical portion 44 of reduced diameter fitting into the hole 40. Coaxial with the cylindrical part 44 is a cam bolt 45 projecting inwardly of the case so that the end 46 of bolt turns in a bearing hole 48 in the lap portion 21. As shown in Fig. 3, especially for clarity, the cam bolt and knob are shown as separate pieces with a force fit at 49. The bolt and knob are held on the body plate 36 by a split spring washer 50 disposed in the recess 37 and in a circumferential groove 51 in the cam bolt, and against the inner face 52 of the boss portion 39. The bolt and knob may be integral.

The cam bolt is provided with a deep transverse slot 54 leaving a keeper engagement portion 60 between the end 46 and the washer, the generally flat bottom 53 of the slot being slightly rounded as at 55 to facilitate camming of the slot bottom against inner face 56 of the keeper bushing 35. The keeper bushing is substantially ring shaped with a sector gap 58 equal to about an eighth of the circumference cut out providing a plane face 59 substantially tangent to the inner face 56. The portion 60 of the bolt may be approximately semi-circular in cross section when the gap is so proportioned. Under certain circumstances the rubber cushions 26 and 28 may not be desirable and so the resilience of the joint between upper and lower parts of the casing may be attained by providing an arcuate slit 61 in the end portion 62 opposite the tangent face at 59, and in which case the bushing 35 is preferably of springy material such as steel to provide a resilient curved spring 61'.

The knob 42 is provided with a butterfly handle 64 hinged thereto, the handle being urged, by a spring 65 in a transverse bore 66 in the knob, so that its outer marginal portion 68 will, when the lock is in locked position, lie against the base plate 36.

Flanges 69 on each side of the base plate prevent rotary motion of the handle about the axis of the knob and bolt when the handle is in such retracted position. Preferably the knob and bolt are limited to a three-quarter turn, that is, between unlocked (Fig. 7) and locked (Figs. 6 and 8) position. This is accomplished by providing the knob 42 with an inner annular groove 70 having a pin 71 therein to engage against detents 72 or 74 projecting from the boss portion 43 into the groove 70.

In operation, the butterfly handle is turned outwardly, against force of spring 65, to clear the flanges 69 and the handle rotated counterclockwise until pin 71 engages the detent 72 where the handle is in unlocked position. The action of the spring 65 normally keeps the handle and the keeper-engaging portion 60 on the same side of the bolt axis. This provides sufficient friction between the handle portion 64 and the shorter upper portions 74' or the flanges 69. Furthermore, any rotation about the axis of the bolt 45 in the locking direction causes the point of engagement $p_1$ between the handle and flange 69—74 to move to a position $P_2$ where the flange projects to a greater extent and so the handle must hinge outwardly against the force of spring 65. Consequently, the handle and bolt are constrained to remain in unlocked position even though the lock be subjected to vibration.

The top 12 is placed on the lower section 11 of the casing so that the bolt in unlocked position passes through the slot 75 in the lap member 22 and thence into the keeper-bushing 35 with which it communicates at the gap 58, and then the handle is rotated to lock position with the rounded surfaces 55 of the bolt camming against the inner faces of the ring.

If the plane of the slot bottom 53 intersects the axis of the bolt then the rounded ends 55 reduce the effective diameter of the keeper engaging portion 60 so that if the handle and bolt are given only a quarter turn, instead of three quarters, from unlock position, a semi-lock position is reached as shown in Fig. 9 slightly exaggerated, but pointing out that the separation of the rim members would be impossible in semi-locked position. This is true so long as the slot is as deep as a radius and the effective diameter or width of the keeper engaging portion 60 exceeds the width of the gap 58.

The stopping of the handle in semi-locked position is of special importance when several locks are used on a case, and when the attainment of lock position is difficult for it will be noted that although separation of the rim members is not possible, nevertheless they are not brought as closely together as is possible since the bolt 45 and keeper 35 are not as nearly coaxial as shown in Fig. 8.

The lock produces a certain amount of lateral relative movement between the rim members as it is turned from unlocked position to semi-locked position and substantially none when turned from semi-locked to locked. Therefore, especially when cushions 26, 28 are used it is often desirable first to bring all the locks on the case to semi-locked position (when engagement of the tongues and cushions is still light) and then turn them to locked position. The shape of the flange 69—74' also holds the handle in semi-locked position.

In another form of the invention the upper joining member 16a as shown in Fig. 10 may be L-shaped so as to be mounted on the top panel 12a in the same manner that upper member 16 is mounted on the side panel part 14.

Also it is possible as shown in Fig. 11 to use a simple tongue or groove joint formed by members 16b and 18b in which the bolt 45b passes through two flanges 21b and 24b of one member and the tongue 22b of the other. This joint is generally not as satisfactory, as that described in Fig. 3 because the alinement is obtained with more difficulty if the joint members are to be flush at their external faces.

The invention claimed is:

1. A lock comprising a base plate having an offset bearing portion provided with a hole therethrough; a rotatable cylindrical bolt member in said hole and provided with a transverse slot; means to prevent longitudinal movement of the bolt member with respect to the plate; a butterfly handle hinged on the bolt member; means for urging the handle to lie against the plate, and flanges on the plate and within the sweep of the handle when the latter lies against the plate to engage the handle to substantially prevent rotation of the handle about the axis of the bolt when the handle lies against the plate.

2. A lock as claimed in claim 1, said flanges outstanding from the plate and outstanding at a lesser extent in the zone about the bearing portion.

3. A lock comprising a base plate provided with a hole therethrough; a rotatable cylindrical bolt member in said hole and provided with a transverse slot; a restraining member in a circumferential groove about the bolt to prevent longitudinal movement in one direction with respect to the plate; a knob engaging the plate and on the bolt for preventing longitudinal motion of the bolt in the opposite direction and for turning the bolt, means for limiting rotation of the bolt member to a range less than a complete revolution, and means for holding the bolt member in a selected position within said range.

4. A lock comprising a base plate having an offset bearing portion provided with a hole therethrough, the portion providing a recess; a rotatable cylindrical bolt in said hole and provided with a transverse slot cutting the bolt about half way through; a detent in said recess and in a circumferential groove about the bolt to prevent longitudinal movement in one direction with respect to the plate; a knob engaging the plate and on the bolt for preventing longitudinal motion of the bolt in the opposite direction and for turning the bolt, an arcuate channel being provided in the knob; a detent member in said channel, and detent means on the bearing portion and projecting into said channel for engagement with said detent member to limit rotation of the knob to about three quarters of a revolution.

5. A lock comprising a base plate having an offset bearing portion provided with a hole therethrough, the portion providing a recess; a rotatable cylindrical bolt in said hole and provided with a transverse slot; a split washer in said recess and in a circumferential groove about the bolt to prevent longitudinal movement thereof in one direction with respect to the plate; a knob engaging the plate and on the bolt for preventing longitudinal motion of the bolt in the opposite direction and for turning the bolt, an arcuate channel being provided in the knob; a detent member in said channel, and detent means on the bearing portion and projecting into said channel for engagement with said detent member to limit rotation of the knob to about three quarters of a revolution, a butterfly handle hinged on the knob and means for urging the handle to lie against the plate, and a flange on and outstanding from the plate and of varying height from the plate providing portions to shroud the handle when the latter lies against the plate in locking position.

6. In a lock, a substantially cylindrical bolt and means for mounting same for turning about the axis of the bolt, said bolt being provided with a transverse slot having the bottom rounded at the ends thereof leaving a keeper engaging cam portion having a cross sectional shape approximately that of a segment of a circle rounded off at the ends thereof, and an annular keeper on said portion having an approximately circular opening of diameter less than that of the bolt, the keeper having an open gap therein of greater width than the minimum thickness of the portion and less width than the maximum width of the portion and communicating with the opening, to permit lateral separation of the bolt and keeper.

7. In a lock, a subtantially cylindrical bolt and means for mounting same for turning about the axis of the bolt, said bolt being provided with a transverse slot rounded at the ends thereof leaving a keeper engaging cam portion having a cross sectional shape approximately that of a semi-circle, having rounded ends, and a keeper on said portion having an approximately circular opening of diameter less than that of the bolt, the keeper having an open gap therein of greater width than the minimum thickness of the portion and less width than the maximum width of the portion and communicating with the opening, to permit separation of the bolt and keeper, one edge of the gap being tangent to the circular opening, the keeper being of resilient material and provided with an arcuate slot opening into the gap to provide a curved spring to engage said portion.

8. For a lock, an approximately annular keeper having a circular opening and an open annular gap communicating with the opening, one edge of the gap being tangent to the circular opening, the keeper being of resilient material and provided with an arcuate slot opening into the gap to provide a curved spring to engage said portion.

9. In a lock assembly, an approximately annular keeper having a circular opening and an open annular gap communicating with the opening, one edge of the gap being tangent to the circular opening, and a rotary cam bolt passing through the opening of the keeper and having an approximately semi-cylindrical portion therein and of slightly smaller radius than that of the opening, the gap being sufficiently wide for lateral entrance therethrough of said portion and narrower than the maximum width of the portion.

10. In a lock assembly mounted on parallel strip members an approximately annular keeper on one of the members and having a circular opening and an open annular gap communicating with the opening, one edge of the gap being tangent to the circular opening, and a rotary cam bolt mounted on the other member for turning three quarters of a revolution and passing through the opening of the keeper and having cam means on the bolt for engaging the inner surfaces of the keeper for drawing the members together in the direction of the line of said edge when the bolt is rotated, said line being perpendicular to the general direction of the strip members.

11. In a lock assembly, an approximately annular keeper having a circular opening and an open annular gap communicating with the opening, one edge of the gap being tangent to the circular opening, and a rotary cam blot passing through the opening of the keeper and having an approximately semi-cylindrical portion therein and of slightly smaller radius than that of the opening, the gap being sufficiently wide for lateral entrance therethrough of said portion and narrower than the maximum width of the portion; a butterfly handle hinged on the bolt, and means for restraining rotary motion of the handle when the axis of the bolt is approximately perpendicular to the handle and the bolt is in locking position.

12. In combination, a strip-like joining member having a lateral lap portion and flange extending in the same direction and providing a medial groove therebetween, the lap portion extending further than the flange; the lap portion having a rabbet groove at the exterior face thereof to form a tongue to lie in the medial groove of a similar mating member; the lap portion having a bearing hole therein; a generally cylindrical rotatable locking bolt mounted on the member and having an end thereof in the bearing hole; means for preventing axial movement of the bolt in both directions and including a knob on the bolt; a handle hinged on the knob so as to lie parallel with the lap portion and disposable substantially perpendicular to the plane of said members to turn the bolt, and flanges fast on the strip for the handle to lie between, when the bolt is in locking position, to prevent turning of the bolt when the handle lies parallel with the members.

13. In combination, lapped first and second strip-like joining members each having a lateral lap portion and flange extending in the same direction and providing a medial groove therebetween, the lap portion extending further than the flange; the lap portions each having a rabbet groove at the exterior faces thereof to form a tongue lying in the medial groove of the other member; the lap portion of the first member having a bearing hole therein; a generally cylindrical rotatable locking bolt mounted on the first member and having an end thereof in the bearing hole and between the outer edges of the flanges; a knob on the bolt, said bolt having a transverse slot therein about halfway through the bolt in the zone of the lap portion of the second member, the second member having a keeper opening in the lap portion thereof, the opening being substantially circular and coaxial with the bolt and having an open gap communicating therewith narrower than the diameter of the bolt and wide enough to receive the bolt at the slot thereof, a butterfly handle hinged on the knob and biased to lie in a position approximately parallel with strip-like members, detent means fast on the first member for holding the handle and bolt against rotary motion when the handle lies in said position and the bolt is in locked position.

14. In combination, lapped first and second strip-like joining members each having a lateral lap portion and flange extending in the same direction and providing a medial groove therebetween, the lap portion extending further than the flange; the lap portions each having a rabbet groove at the exterior faces thereof to form a tongue lying in the medial groove of the other member; the lap portion of the first member having a bearing hole therein; a generally cylindrical rotatable locking bolt mounted on the first member and having an end thereof in the bearing hole and between the outer edges of the flanges, means for preventing axial movement of the bolt in both directions and including a knob on the bolt, said bolt having a transverse slot therein about halfway through the bolt in the zone of the lap portion of the second member, the second member having a keeper opening in the lap portion thereof, the opening being substantially circular and approximately coaxial with the bolt and having an open gap communicating therewith narrower than the diameter of the bolt and wide enough to receive the bolt at the slot thereof, one edge of the gap being substantially tangential with the opening and substantially perpendicular to the general longitudinal direction of extent of the joining members.

15. In combination, lapped first and second strip-like joining members each having a lateral lap portion and flange extending in the same direction and providing a medial groove therebetween, the lap portion extending further than the flange; the lap portions each having a rabbet groove at the exterior faces thereof to form a tongue lying in the medial groove of the other member; the lap portion of the first member having a bearing hole therein; a generally cylindrical rotatable locking bolt mounted on the first member and having an end thereof in the bearing hole and between the outer edges of the flanges, means for preventing axial movement of the bolt in both directions and including a knob on the bolt, said bolt having a transverse slot therein a little more than halfway through the bolt in the zone of the lap portion of the second member, the second member having a keeper opening in the lap portion thereof, the opening being substantially circular and coaxial with the bolt and having an open gap communicating therewith narrower than the diameter of the bolt and wide enough to receive the bolt at the slot thereof, a butterfly handle hinged on the knob and biased to lie in a position approximately parallel with strip-like members, detent means fast on the first member for holding the handle and bolt against rotary movement when the handle lies in said position and the bolt is in locked position.

References Cited in the file of this patent

UNITED STATES PATENTS

| | | |
|---|---|---|
| 274,354 | McCarthy | Mar. 20, 1883 |
| 550,221 | Euphrat | Nov. 19, 1895 |
| 880,318 | Mattox | Feb. 25, 1908 |
| 1,042,081 | Camp | Oct. 22, 1912 |
| 1,212,262 | Rockwell | Jan. 16, 1917 |
| 1,781,115 | Lewis | Nov. 11, 1930 |
| 2,469,601 | Lee | May 10, 1949 |
| 2,505,945 | Dath | May 2, 1950 |
| 2,560,196 | Smith | July 10, 1951 |
| 2,583,873 | Nichols | Jan. 29, 1952 |
| 2,656,946 | Clarke | Oct. 27, 1953 |
| 2,674,390 | Meyer | Apr. 6, 1954 |
| 2,688,509 | Schonitzer | Sept. 7, 1954 |